US009444874B2

(12) United States Patent
Chhabra et al.

(10) Patent No.: US 9,444,874 B2
(45) Date of Patent: *Sep. 13, 2016

(54) AUTOMATIC AD-HOC NETWORK CREATION AND COALESCING USING WPS

(71) Applicant: Marvell International Ltd., Hamilton (BM)

(72) Inventors: Kapil Chhabra, Sunnyvale, CA (US); Rahul Kopikare, Livermore, CA (US); Milind Kopikare, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 88 days.

This patent is subject to a terminal disclaimer.

(21) Appl. No.: 14/281,317

(22) Filed: May 19, 2014

(65) Prior Publication Data

US 2014/0258550 A1 Sep. 11, 2014

Related U.S. Application Data

(63) Continuation of application No. 11/867,661, filed on Oct. 4, 2007, now Pat. No. 8,732,315.

(60) Provisional application No. 60/829,614, filed on Oct. 16, 2006.

(51) Int. Cl.
*G06F 15/16* (2006.01)
*H04L 29/08* (2006.01)
(Continued)

(52) U.S. Cl.
CPC ............. *H04L 67/04* (2013.01); *H04L 5/0091* (2013.01); *H04W 48/16* (2013.01); *H04W 84/18* (2013.01)

(58) Field of Classification Search
CPC .... H04L 67/04; H04L 5/0091; H04W 48/16; H04W 84/18
See application file for complete search history.

(56) References Cited

U.S. PATENT DOCUMENTS

| 4,959,847 A | 9/1990 | Engelke et al. |
| 5,488,693 A | 1/1996 | Houck et al. |

(Continued)

FOREIGN PATENT DOCUMENTS

| CN | 1375772 A | 10/2002 |
| CN | 1522503 A | 8/2004 |

(Continued)

OTHER PUBLICATIONS

U.S. Appl. No. 11/867,665, "Power Save Mechanisms for Dynamic AD-HOC Networks," Kopikare et al., filed Oct. 4, 2007, 43 pages.

(Continued)

*Primary Examiner* — Abdelnabi Musa

(57) ABSTRACT

A device previously configured as a registrar and that has established an independent ad-hoc network is automatically discovered by another device also previously configured as a registrar. To form an ad-hoc wireless network between these two devices, each device periodically enters a scanning mode to scan for and intercept beacons transmitted by the other device. Upon such interception, one of the devices becomes an enrollee in accordance with a predefined condition and in response to a user selected option. Subsequently, the enrollee modifies its beacons to include an attribute, such as the MAC address, associated with the other device. After intercepting the modified beacon, the remaining registrar prompts it user to decide whether to allow the enrollee to join the registrar's network. If the user responds affirmatively, a handshake is performed between the two devices and a subsequent attempt is made by the enrollee to join the registrar's network.

20 Claims, 6 Drawing Sheets

(51) Int. Cl.
*H04L 5/00* (2006.01)
*H04W 48/16* (2009.01)
*H04W 84/18* (2009.01)

(56) References Cited

U.S. PATENT DOCUMENTS

| | | |
|---|---|---|
| 5,738,583 A | 4/1998 | Comas et al. |
| 5,850,592 A | 12/1998 | Ramanathan |
| 5,877,701 A | 3/1999 | Nagakura |
| 6,272,120 B1 | 8/2001 | Alexander |
| 6,309,301 B1 | 10/2001 | Sano |
| 6,315,668 B1 | 11/2001 | Metke et al. |
| 6,453,181 B1 | 9/2002 | Challa et al. |
| 6,524,189 B1 | 2/2003 | Rautila |
| 6,590,928 B1 | 7/2003 | Haartsen |
| 6,600,726 B1 | 7/2003 | Nevo et al. |
| 6,662,229 B2 | 12/2003 | Passman et al. |
| 6,690,935 B1 | 2/2004 | Calot et al. |
| 6,704,866 B1 | 3/2004 | Benayoun et al. |
| 6,707,801 B2 | 3/2004 | Hsu |
| 6,760,587 B2 | 7/2004 | Holtzman et al. |
| 6,785,892 B1 | 8/2004 | Miller et al. |
| 6,788,675 B1 | 9/2004 | Yang |
| 6,793,580 B2 | 9/2004 | Sinclair et al. |
| 6,795,701 B1 | 9/2004 | Baker et al. |
| 6,799,056 B2 | 9/2004 | Curley et al. |
| 6,859,460 B1 | 2/2005 | Chen |
| 6,879,570 B1* | 4/2005 | Choi ............ H04W 84/20 370/329 |
| 6,879,574 B2 | 4/2005 | Naghian et al. |
| 6,879,812 B2 | 4/2005 | Agrawal et al. |
| 6,909,705 B1 | 6/2005 | Lee et al. |
| 6,932,698 B2 | 8/2005 | Sprogis |
| 6,970,726 B2 | 11/2005 | Takayanagi |
| 6,975,613 B1 | 12/2005 | Johansson |
| 6,980,522 B2 | 12/2005 | Boyle |
| 7,013,391 B2 | 3/2006 | Herle et al. |
| 7,072,323 B2 | 7/2006 | Roberts et al. |
| 7,073,129 B1 | 7/2006 | Robarts et al. |
| 7,095,732 B1 | 8/2006 | Watson, Jr. |
| 7,097,562 B2 | 8/2006 | Gagner |
| 7,110,366 B2 | 9/2006 | Hulyalkar et al. |
| 7,120,129 B2 | 10/2006 | Ayyagari et al. |
| 7,120,456 B1 | 10/2006 | Elliot et al. |
| 7,158,798 B2 | 1/2007 | Lee et al. |
| 7,181,544 B2 | 2/2007 | Vangal et al. |
| 7,190,961 B2 | 3/2007 | Burr |
| 7,224,964 B2 | 5/2007 | Souissi et al. |
| 7,236,772 B1 | 6/2007 | Botzas |
| 7,251,235 B2 | 7/2007 | Wentink |
| 7,257,721 B2 | 8/2007 | Chung et al. |
| 7,324,444 B1 | 1/2008 | Liang et al. |
| 7,347,781 B2 | 3/2008 | Schultz |
| 7,400,722 B2 | 7/2008 | Qi et al. |
| 7,435,179 B1 | 10/2008 | Ford |
| 7,440,430 B1 | 10/2008 | Jagadeesan et al. |
| 7,452,278 B2 | 11/2008 | Chen et al. |
| 7,457,271 B2 | 11/2008 | Donovan |
| 7,496,065 B2 | 2/2009 | Anjum et al. |
| 7,505,795 B1 | 3/2009 | Lim et al. |
| 7,515,897 B2 | 4/2009 | Suzuki |
| 7,616,588 B2 | 11/2009 | Gatta et al. |
| 7,729,661 B2 | 6/2010 | Tanaka et al. |
| 7,733,861 B2 | 6/2010 | Suga |
| 7,899,017 B2 | 3/2011 | Yu et al. |
| 7,978,647 B2 | 7/2011 | Anjum et al. |
| 7,990,903 B2 | 8/2011 | Nishihara et al. |
| 8,073,923 B2 | 12/2011 | Sasaki et al. |
| 8,180,363 B2 | 5/2012 | Maekawa et al. |
| 8,321,587 B2 | 11/2012 | Burr |
| 8,787,988 B2 | 7/2014 | Wentink |
| 2001/0055950 A1 | 12/2001 | Davies et al. |
| 2002/0013784 A1 | 1/2002 | Swanson |
| 2002/0061743 A1 | 5/2002 | Hutcheson et al. |
| 2002/0091790 A1 | 7/2002 | Cubley |
| 2002/0103019 A1 | 8/2002 | Emmerson |
| 2002/0107985 A1 | 8/2002 | Hwang et al. |
| 2002/0147044 A1 | 10/2002 | Jakobsson et al. |
| 2002/0151366 A1 | 10/2002 | Walker et al. |
| 2002/0159401 A1 | 10/2002 | Boger |
| 2002/0176366 A1 | 11/2002 | Ayyagari et al. |
| 2002/0191560 A1 | 12/2002 | Chen et al. |
| 2002/0191573 A1 | 12/2002 | Whitehill et al. |
| 2002/0199124 A1 | 12/2002 | Adkisson |
| 2003/0023761 A1 | 1/2003 | Jeansonne et al. |
| 2003/0041150 A1* | 2/2003 | Passman ............ H04W 84/20 709/227 |
| 2003/0069018 A1 | 4/2003 | Matta et al. |
| 2003/0078062 A1 | 4/2003 | Burr |
| 2003/0084337 A1 | 5/2003 | Simionescu et al. |
| 2003/0099212 A1 | 5/2003 | Anjum et al. |
| 2003/0163579 A1 | 8/2003 | Knauerhase et al. |
| 2003/0182454 A1 | 9/2003 | Huth et al. |
| 2003/0224855 A1 | 12/2003 | Cunningham |
| 2003/0231189 A1 | 12/2003 | Williams |
| 2003/0231625 A1 | 12/2003 | Calvignac et al. |
| 2004/0066751 A1 | 4/2004 | Tseng et al. |
| 2004/0078372 A1 | 4/2004 | Huuskonen |
| 2004/0081110 A1 | 4/2004 | Koskimies |
| 2004/0082383 A1 | 4/2004 | Muncaster et al. |
| 2004/0105415 A1 | 6/2004 | Fujiwara et al. |
| 2004/0110563 A1 | 6/2004 | Tanaka et al. |
| 2004/0127277 A1 | 7/2004 | Walker et al. |
| 2004/0127289 A1 | 7/2004 | Davis et al. |
| 2004/0139159 A1 | 7/2004 | Ricciardi et al. |
| 2004/0146022 A1 | 7/2004 | Lewis et al. |
| 2004/0174829 A1 | 9/2004 | Ayyagari |
| 2004/0185851 A1 | 9/2004 | Nagai |
| 2004/0196808 A1 | 10/2004 | Chaskar et al. |
| 2004/0259542 A1 | 12/2004 | Vitamaki et al. |
| 2005/0032577 A1 | 2/2005 | Blackburn et al. |
| 2005/0041660 A1 | 2/2005 | Pennec et al. |
| 2005/0073980 A1 | 4/2005 | Thomson et al. |
| 2005/0088980 A1 | 4/2005 | Olkkonen et al. |
| 2005/0099977 A1 | 5/2005 | Williams et al. |
| 2005/0122940 A1 | 6/2005 | Nian |
| 2005/0129055 A1 | 6/2005 | Hall et al. |
| 2005/0138462 A1 | 6/2005 | Hunt et al. |
| 2005/0157661 A1 | 7/2005 | Cho |
| 2005/0177639 A1 | 8/2005 | Reunamäki et al. |
| 2005/0181872 A1 | 8/2005 | Acharya et al. |
| 2005/0197189 A1 | 9/2005 | Schultz |
| 2005/0221897 A1 | 10/2005 | Oe |
| 2005/0250487 A1 | 11/2005 | Miwa et al. |
| 2005/0250497 A1 | 11/2005 | Ghosh et al. |
| 2005/0268003 A1 | 12/2005 | Wang et al. |
| 2005/0268151 A1 | 12/2005 | Hunt et al. |
| 2005/0286456 A1 | 12/2005 | McNew et al. |
| 2005/0286464 A1 | 12/2005 | Saadawi et al. |
| 2005/0286480 A1 | 12/2005 | Akiyama |
| 2006/0013160 A1 | 1/2006 | Haartsen |
| 2006/0039341 A1 | 2/2006 | Ptasinski et al. |
| 2006/0041750 A1 | 2/2006 | Carter et al. |
| 2006/0045138 A1 | 3/2006 | Black et al. |
| 2006/0046709 A1 | 3/2006 | Krumm et al. |
| 2006/0056378 A1 | 3/2006 | Sugaya |
| 2006/0062220 A1 | 3/2006 | Suga |
| 2006/0095290 A1 | 5/2006 | Chernev |
| 2006/0106963 A1 | 5/2006 | Sasaki et al. |
| 2006/0135261 A1 | 6/2006 | Kinne et al. |
| 2006/0135262 A1 | 6/2006 | Kennedy et al. |
| 2006/0153156 A1 | 7/2006 | Wentink et al. |
| 2006/0154710 A1 | 7/2006 | Serafat |
| 2006/0166740 A1 | 7/2006 | Sufuentes |
| 2006/0179322 A1 | 8/2006 | Bennett et al. |
| 2006/0205409 A1 | 9/2006 | Chiou et al. |
| 2006/0221856 A1 | 10/2006 | Quiroz |
| 2006/0221858 A1* | 10/2006 | Switzer ............ G06F 9/4443 370/254 |
| 2006/0221915 A1 | 10/2006 | Gatta et al. |
| 2006/0246947 A1 | 11/2006 | Fujii et al. |
| 2006/0251004 A1 | 11/2006 | Zhong et al. |
| 2006/0259632 A1 | 11/2006 | Crawford et al. |
| 2006/0282541 A1 | 12/2006 | Hiroki |

(56) References Cited

U.S. PATENT DOCUMENTS

| | | | |
|---|---|---|---|
| 2006/0287099 | A1 | 12/2006 | Shaw et al. |
| 2007/0030116 | A1 | 2/2007 | Feher |
| 2007/0030824 | A1 | 2/2007 | Ribaudo et al. |
| 2007/0047547 | A1 | 3/2007 | Conner et al. |
| 2007/0060355 | A1 | 3/2007 | Amaitis et al. |
| 2007/0060358 | A1 | 3/2007 | Amaitis et al. |
| 2007/0086394 | A1 | 4/2007 | Yamada et al. |
| 2007/0086424 | A1* | 4/2007 | Calcev ............... H04J 3/0641 370/350 |
| 2007/0099703 | A1 | 5/2007 | Terebilo |
| 2007/0105548 | A1 | 5/2007 | Mohan et al. |
| 2007/0141988 | A1 | 6/2007 | Kuehnel et al. |
| 2007/0147317 | A1* | 6/2007 | Smith ................. H04W 48/18 370/338 |
| 2007/0155505 | A1 | 7/2007 | Huomo |
| 2007/0171882 | A1 | 7/2007 | Lee |
| 2007/0190494 | A1 | 8/2007 | Rosenberg |
| 2007/0202890 | A1 | 8/2007 | Feher |
| 2007/0202910 | A1 | 8/2007 | Brewer et al. |
| 2007/0265018 | A1 | 11/2007 | Feher |
| 2007/0291761 | A1 | 12/2007 | Kauniskangas et al. |
| 2008/0013487 | A1 | 1/2008 | Molteni et al. |
| 2008/0019522 | A1 | 1/2008 | Proctor |
| 2008/0037444 | A1 | 2/2008 | Chhabra |
| 2008/0037495 | A1 | 2/2008 | Anjum et al. |
| 2008/0039015 | A1 | 2/2008 | Nakata et al. |
| 2008/0043868 | A1 | 2/2008 | Feher |
| 2008/0069105 | A1 | 3/2008 | Costa et al. |
| 2008/0095112 | A1 | 4/2008 | Wiemann et al. |
| 2008/0096662 | A1 | 4/2008 | Kuwahara et al. |
| 2008/0108437 | A1 | 5/2008 | Kaarela et al. |
| 2008/0146337 | A1 | 6/2008 | Halonen et al. |
| 2008/0146343 | A1 | 6/2008 | Sullivan et al. |
| 2008/0164984 | A1 | 7/2008 | Sheffer |
| 2008/0167865 | A1 | 7/2008 | Yamanashi et al. |
| 2008/0172491 | A1 | 7/2008 | Chhabra et al. |
| 2008/0220878 | A1 | 9/2008 | Michaelis |
| 2009/0011834 | A1 | 1/2009 | Chhabra |
| 2009/0048024 | A1 | 2/2009 | Tanaka et al. |
| 2009/0092060 | A1 | 4/2009 | Goto |
| 2009/0180441 | A1 | 7/2009 | Ikeda |
| 2009/0191878 | A1 | 7/2009 | Hedqvist et al. |
| 2009/0210531 | A1 | 8/2009 | Melnikov |
| 2009/0279506 | A1 | 11/2009 | Sinnreich et al. |
| 2010/0087240 | A1 | 4/2010 | Egozy et al. |
| 2010/0278077 | A1* | 11/2010 | Reunamaki .......... H04W 84/18 370/254 |
| 2012/0072485 | A1 | 3/2012 | Hutcheson et al. |
| 2012/0329554 | A1 | 12/2012 | Mgrdechian et al. |

FOREIGN PATENT DOCUMENTS

| | | |
|---|---|---|
| CN | 1842000 A | 10/2006 |
| EP | 1 622 319 A2 | 2/2006 |
| JP | 2004-136009 | 10/2002 |
| JP | 2004-141225 | 10/2002 |
| JP | 2003-289277 | 10/2003 |
| JP | 2004-135778 | 5/2004 |
| JP | 2006-086959 | 9/2004 |
| JP | 2006-050020 | 2/2006 |
| JP | 2006-148448 | 6/2006 |
| JP | 2006-148488 A | 6/2006 |
| WO | 03/003610 A1 | 6/2002 |
| WO | WO 2004/062198 A1 | 7/2004 |
| WO | WO 2005/011203 A1 | 2/2005 |
| WO | WO 2005/076543 | 8/2005 |

OTHER PUBLICATIONS

Extended European Search Report in corresponding European Application No. 07853857.6, dated Nov. 28, 2013, 9 pages.
International Search Report for corresponding PCT Application No. PCT/US2007/080733 mailed Sep. 9, 2008.
Written Opinion for corresponding PCT Application No. PCT/US2007/08733 mailed Sep. 9, 2008.
Notification Concerning Transmittal of International Preliminary Report on Patentability for corresponding PCT Application No. PCT/US2007/080733 mailed Apr. 30, 2009.
Chinese Office Action issued in Chinese Application No. 200780038678.7, dated Sep. 13, 2010 (17 pages including translation).
Chinese Office Action dated Jul. 8, 2010 for Application No. 200780037626.8 (11 pages).
International Search Report for PCT Application No. PCT/US07/17529, mailed Oct. 1, 2008 (1 page).
Lortz et al., "Wi-Fi Simple Config Specification", Wi-Fi Alliance Confidential, Version 1.0a, Feb. 10, 2006 (107 pages).
Office Action issued in U.S. Appl. No. 11/800,166, mailed Jun. 25, 2009 (27 pages).
Office Action issued in U.S. Appl. No. 11/800,166, mailed Feb. 24, 2010 (30 pages).
Office Action issued in U.S. Appl. No. 11/800,166, mailed Aug. 19, 2010 (32 pages).
Office Action issued in U.S. Appl. No. 11/800,166, mailed Mar. 29, 2011 (29 pages).
Office Action issued in U.S. Appl. No. 11/867,665, mailed Nov. 23, 2010 (6 pages).
Notice of Allowance issued in U.S. Appl. No. 11/867,665, mailed Feb. 28, 2011 (8 pages).
Written Opinion of the International Searching Authority for PCT Application No. PCT/US07/17529, mailed Oct. 1, 2008 (5 pages).
IEEE, "Further Higher-Speed Physical Layer Extension in the 2.4 GHz Band", IEEE, Draft Std 802.11g-2002, New York, NY, May 2002, Downloaded from the Internet (47 pages).
IEEE, "Part 11: Wireless LAN Medium Access Control (MAC) and Physical Layer (PHY) specifications, Amendment 2: Higher-speed Physical Layer (PHY) extension in the 2.4 GHz band", IEEE Std 802.11b-1999/Cor 1-2001, New York, NY, Nov. 7, 2001, Downloaded from the Internet (23 pages).
IEEE, "Part 11: Wireless LAN Medium Access Control (MAC) and Physical Layer (PHY) specifications, Amendment 5: Spectrum and Transmit Power Management Extensions in the 5 GHz band in Europe", IEEE Std 802.11h-2003, New York, NY, Oct. 14, 2003, Downloaded from the Internet (75 pages).
IEEE, "Part 11: Wireless LAN Medium Access Control (MAC) and Physical Layer (PHY) specifications, Amendment 6: Medium Access Control (MAC) Security Enhancements", IEEE Std 802.11i-2004, New York, NY, Jul. 23, 2004, Downloaded from the Internet (190 pages).
IEEE, "Part 11: Wireless LAN Medium Access Control (MAC) and Physical Layer (PHY) specifications, Amendment 7: Medium Access Control (MAC) Quality of Service (QoS) Enhancements", IEEE P802.11e/D11.0, New York, NY, Oct. 2004, Downloaded from the Internet (195 pages).
IEEE, "Part 11: Wireless LAN Medium Access Control (MAC) and Physical Layer (PHY) specifications: Further Higher Data Rate Extension in the 2.4 GHz Band", IEEE P802.11g/D8.2, New York, NY, Apr. 2003, Downloaded from the Internet (69 pages).
IEEE, "Part 11: Wireless LAN Medium Access Control (MAC) and Physical Layer (PHY) specifications: High-speed Physical Layer in the 5 Ghz Band", IEEE Std 802.11a-1999, New York, NY, Dec. 30, 1999, Downloaded from the Internet (91 pages).
IEEE, "Part 11: Wireless LAN Medium Access Control (MAC) and Physical Layer (PHY) specifications: Higher-Speed Physical Layer Extension in the 2.4 GHz Band", IEEE Std 802.11b-1999, New York, NY, Jan. 20, 2000, Downloaded from the Internet (96 pages).
IEEE, "TGn Sync Proposal Technical Specification-Abstract," IEEE 802.11-04/0889r6, Mujtaba, Syed Aon, Agere Systems, Allentown, PA, May 18, 2005, Downloaded from the Internet (131 pages).
U.S. Appl. No. 11/867,665, filed Oct. 4, 2007, Kopikare, Rahul et al., entitled "Power Save Mechanisms for Dynamic AD-HOC Networks" (43 pages).
U.S. Appl. No. 11/924,431, filed Oct. 25, 2007, Kopikare, et al., entitled "System and Method for Gaming in an AD-HOC Network" (32 pages).
Office Action issued in U.S. Appl. No. 11/924,431, mailed Apr. 12, 2011 (10 pages).

(56) References Cited

OTHER PUBLICATIONS

Office Action issued in U.S. Appl. No. 11/924,431, dated Oct. 17, 2011 (14 pages).
Office Action issued in U.S. Appl. No. 12/167,804, dated Sep. 2, 2011 (8 pages).
Office Action issued in Chinese patent application No. 200780038678.7, issued Oct. 18, 2011 (16 pages, including English translation).
Office Action issued in U.S. Appl. No. 11/800,166, dated Nov. 3, 2011 (37 pages).
Hirano Aya, "Introductory Techniques for Current Wireless LAN," Nikkei network vol. 67, Japan Nikkei BP, Nikkei Business Publications, Inc., 2005, (see also English translation of Summary of Japanese Office Action dated Nov. 29, 2011).
Japanese Office Action dated Nov. 29, 2011 for Japanese Patent Application No. 2009-523819, including English translation of Summary of Japanese Office Action.
Japanese Office Action dated Feb. 7, 2012 for Japanese Patent Application No. 2009-532521, including English translation of Summary of Japanese Office Action.
U.S. Appl. No. 11/800,166, "AD-HOC Simple Configuration," Kapil Chhabra, filed May 4, 2007, 34 pages.
U.S. Appl. No. 12/167,804, "Location Aware AD-HOC Gaming," Kapil Chhabra, filed Jul. 3, 2008, 22 pages.
International Search Report for corresponding PCT Application No. PCT/US2008/069185, mailed Sep. 3, 2008, 1 page.
Written Opinion for corresponding PCT Application No. PCT/US2008/069185, mailed Sep. 3, 2008, 1 page.
Office Action issued in U.S. App. No. 11/542,393, mailed Nov. 9, 2009, 28 pages.
Office Action issued in U.S. Appl. No. 11/542,393, mailed Apr. 9, 2010, 30 pages.
Office Action issued in U.S. Appl. No. 11/867,661, mailed Jun. 11, 2010, 28 pages.
Office Action issued in U.S. Appl. No. 11/542,393, mailed Aug. 5, 2010, 45 pages.
Office Action issued in U.S. Appl. No. 11/542,393, mailed Apr. 13, 2011, 98 pages.
Notice of Allowance issued in U.S. Appl. No. 11/867,665, mailed Sep. 2, 2011, 11 pages.
Office Action issued in U.S. Appl. No. 12/167,804, mailed Dec. 22, 2011, 14 pages.
Notice of Allowance issued in U.S. Application No. 11/867,665, mailed Feb. 10, 2012, 11 pages.
Office Action issued in U.S. Appl. No. 11/800,166, mailed Apr. 20, 2012, 47 pages.
Third Office Action issued in Chinese Application No. 200780038678.7, dated Apr. 28, 2012, 2 pages, English language translation.
Notice of Allowance issued in U.S. Appl. No. 11/542,393, mailed May 14, 2012, 45 pages.
Office Action issued in U.S. Appl. No. 12/167,804, mailed May 23, 2012, 15 pages.
Notice of Allowance issued in U.S. Appl. No. 11/800,166, mailed Aug. 14, 2012, 19 pages.
Office Action issued in Japanese Application No. 2009-532521, dated Sep. 18, 2012, 3 pages, English language summary and translation.
Notice of Allowance issued in U.S. Appl. No. 12/167,804, mailed Sep. 26, 2012, 16 pages.
Office Action issued in U.S. Appl. No. 11/924,431, mailed Nov. 26, 2012, 27 pages.
Office Action issued in Japanese Application No. 2009-532521, English Translation, dated Jan. 15, 2013, 5 pages.
Notice of Allowance issued in U.S. Appl. No. 11/800,166, mailed Feb. 22, 2013, 6 pages.
Notice of Allowance issued in U.S. Appl. No. 12/167,804, mailed Mar. 19, 2013, 15 pages.
Notice of Allowance issued in U.S. Appl. No. 11/800,166, mailed May 21, 2013, 7 pages.
Lety, Emmanuel et al., "MiMaze, a 3D Multi-Player Game on the Internet," Proc. of the 4th International Conference of VSMM (Virtual Systems and MultiMedia), Gifu, Japan, 1998, 6 pages.
Zander, Sebastian et al., "Achieving Fairness in Multiplayer Network Games through Automated Latency Balancing," ACE 2005, Proceedings of the 2005 ACM SIGCHI International Conference on Advances in Computer Entertainment Technology, Valencia, Spain, 2005, pp. 117-124.

* cited by examiner

AUTOMATIC AD-HOC NETWORK CREATION AND COALESCING USING WPS

CROSS-REFERENCES TO RELATED APPLICATIONS

This application is a continuation application of U.S. Non-Provisional application Ser. No. 11/867,661, filed Oct. 4, 2007 (now U.S. Pat. No. 8,732,315), which claims the benefit of U.S. provisional application No. 60/829,614, filed Oct. 16, 2006. The contents of U.S. Non-Provisional application Ser. No. 11/867,661 (now U.S. Pat. No. 7,732,315) and U.S. Provisional Application No. 60/829,614 are each incorporated by reference in their entirety.

The present application is also related to U.S. application Ser. No. 11/800,166, filed May 4, 2007, entitled "Ad-Hoc Simple Configuration", commonly assigned, the content of which is incorporated herein by reference in its entirety.

The present application is also related to U.S. application Ser. No. 11/867,665, filed concurrently herewith, entitled "Power Save Mechanisms For Dynamic Ad-Hoc Networks", commonly assigned, the content of which is incorporated herein by reference in its entirety.

BACKGROUND OF THE INVENTION

The present invention relates to wireless communication networks, and more particularly to a protocol for establishing an ad-hoc wireless fidelity (WiFi) network.

WiFi networks are well known and are being increasingly used to exchange data. One known WiFi standard, commonly referred to as WiFi Protected Setup (WPS) or WiFi Simple Configuration (WSC), is a Wireless Local Area Network (WLAN) standard that defines the communication modes and the associated configuration protocols for an infrastructure WLAN.

There are three logical components in an infrastructure WSC network, namely a registrar, an access point (AP) and an enrollee. Referring to FIG. 1A, to establish a wireless communications link with legacy AP 10, WSC client 12 first seeks to acquire network credentials from external registrar 14 using an 802.11 ad-hoc network. Subsequently, WSC client 12 establishes a link to legacy AP 10 using the network credentials that WSC client 12 has acquired from external registrar 14.

Referring to FIG. 1B, AP 20 is shown as having an embedded registrar. To establish a communications link with AP 20, WSC client 22 first seeks to acquire network credentials from AP 20's embedded registrar over an 802.11 infrastructure network. Subsequently, using the acquired network credentials, WSC client 22 wirelessly connects to AP 20.

Referring to FIG. 1C, to establish a communications link with WSC AP 30, WSC client 32 first seeks to acquire network credentials using an extended authentication protocol (EAP) via WSC AP 30. WSC AP 30 relays the WSC client 32's EAP message to registrar 34 using a Universal Plug and Play (UpnP) protocol. Next, using the acquired network credentials supplied by registrar 34, WSC client 32 establishes a communications link with WSC AP 30. WSC and its communication protocols are described, for example, in Wi-Fi Simple Configuration Specification, Version 1.0a, Feb. 10, 2006, by Wi-Fi Simple Configuration Working Group in the Wi-Fi Alliance.

As electronic devices with wireless network capabilities become more pervasive, it would be desirable to enable two or more of such devices to form an ad-hoc wireless network to exchange data or interact without using an access point. Furthermore, it would be desirable to ensure that such data exchange or interaction is carried out in a user-friendly manner.

BRIEF SUMMARY OF THE INVENTION

In accordance with one embodiment of the present invention, a method of enabling a first device to join an ad-hoc network previously established by a second device includes, in part, placing the first device in a scanning mode during one of each N beacon transmission periods to scan for beacons transmitted by the second device, and prompting a user of the first device to join the ad-hoc network if the first device intercepts a beacon of the second device during the scanning mode. The first and second devices are previously configured as registrars.

The method further includes, in part, modifying beacons of the first device to include an attribute associated with the second device if the user responds affirmatively to the option; and attempting to reconfigure the first device as an enrollee if the user responds affirmatively to the option. The method further includes, in part, modifying beacons of the first device if a condition is satisfied.

In some embodiments, the condition is defined by a comparison of time stamps from ad-hoc beacons associated with the two devices. In other embodiments, the condition is defined by a comparison of media access controller (MAC) addresses of the two devices. In some embodiments, the option is presented via a text displayed on an LCD panel disposed on the first device. In another embodiment, the option is presented via an audible sound played through a speaker disposed on the first device. In some embodiments, the attribute that is included in the modified beacon is the MAC address of the second device. In one embodiment, the first device joins the ad-hoc network previously established by the second device without either of the first and second devices being first powered off.

In accordance with another embodiment of the present invention, a method of adding a first device to an ad-hoc network previously established by a second device includes, in part, placing the second device in a scanning mode during one of each N beacon transmission periods to scan for beacons transmitted by the first device, intercepting a beacon of the first device during one of the scan periods of the second device; verifying whether the intercepted beacon includes an attribute of the second device; and prompting a user with an option to allow the first device to be added to the ad-hoc network if the intercepted beacon includes the attribute. The first and second devices are previously configured as registrars. The method further includes, in part, performing a handshake if the user responds affirmatively to the option.

In one embodiment, the option is presented via a text displayed on an LCD panel disposed on the second device. In another embodiment, the option is presented via an audible sound played on a speaker disposed on the second device. In one embodiment, the attribute is the MAC address of the second device. In one embodiment, the beacons of the first device is modified to include the attribute associated with the second device. In one embodiment, the first device joins the ad-hoc network previously established by the second device without either of the first and second devices being first powered off A device in accordance with one embodiment of the present invention is adapted to participate in a wireless ad-hoc network session. The device is initially configured to operate as a registrar and is operative to operate in a scanning mode during one of each N beacon transmission periods to scan for beacons transmitted by a second device. The first device is further operative to prompt a user to join the ad-hoc network of the second device if the first device intercepts a beacon of the second device during the scanning mode.

In one embodiment, the first device is further operative to modify its beacons to include an attribute associated with the second device if the user responds affirmatively to the option. If the user responds affirmatively to the option, the first device become an enrollee. In one embodiment, the condition is defined by a comparison of time stamps. In another embodiment, the condition is defined by a comparison of media access controller (MAC) addresses. In one embodiment, the beacons of the first device are modified if a condition is satisfied.

In one embodiment, the first device includes an LCD panel to display the option. In another embodiment, the first device includes a speaker adapted to audibly broadcast the option. In some embodiments, the attribute is the MAC address of the second device. In one embodiment, the first device joins the ad-hoc network previously established by the second device without either of the first and second devices being first powered off.

A device in accordance with another embodiment of the present invention is adapted to be placed in a scanning mode during one of each N beacon transmission periods to scan and intercept beacons transmitted by a second device. The first device is further adapted to verify whether the intercepted beacon includes an attribute of the first device and to prompt a user with an option to allow the second device to be added to the ad-hoc network previously established by the first device. The first device is further adapted to initiate a handshake if the user responds affirmatively to the option.

In one embodiment, the first device includes an LCD panel to display the option. In another embodiment, the first device includes a speaker adapted to audibly broadcast the option. In some embodiments, the attribute is the MAC address of the first device. In one embodiment, the beacons of the first device is modified to include the attribute associated with the second device. In one embodiment, the first device joins the ad-hoc network previously established by the second device without either of the first and second devices being first powered off.

A device in accordance with one embodiment of the present invention includes, in part, means for enabling the device to join an ad-hoc network previously established by a second device, means for placing the first device in a scanning mode during one of each N beacon transmission periods to scan for beacons transmitted by the second device, and means for prompting a user of the first device to join the ad-hoc network if the first device intercepts a beacon of the second device during the scanning mode. The first and second devices are previously configured as registrars.

The device further includes, in part, means for modifying beacons of the first device to include an attribute associated with the second device if the user responds affirmatively to the option; and means for attempting to reconfigure the first device as an enrollee if the user responds affirmatively to the option. The device further includes, in part, means for modifying its beacons if a condition is satisfied.

In some embodiments, the condition is defined by a comparison of time stamps associated with the two devices. In other embodiments, the condition is defined by a comparison of media access controller (MAC) addresses of the two devices. In some embodiments, the option is presented via a text displayed on an LCD panel disposed on the first device. In another embodiment, the option is presented via an audible sound played through a speaker disposed on the first device. In some embodiments, the attribute that is included in the modified beacon is the MAC address of the second device. In one embodiment, the first device joins the ad-hoc network previously established by the second device without either of the first and second devices being first powered off.

A device in accordance with another embodiment of the present invention includes, in part, means for placing the device in a scanning mode during one of each N beacon transmission periods to scan for beacons transmitted by a second device, means for intercepting a beacon of the second device during one of the scan periods of the first device; means for verifying whether the intercepted beacon includes an attribute of the first device; and means for prompting a user with an option to allow the second device to be added to the ad-hoc network of the first device if the intercepted beacon includes the attribute. The first and second devices are previously configured as registrars. The device further includes, in part, means for performing a handshake if the user responds affirmatively to the option.

In one embodiment, the option is presented via a text displayed on an LCD panel disposed on the second device. In another embodiment, the option is presented via an audible sound played on a speaker disposed on the second device. In one embodiment, the attribute is the MAC address of the second device. In one embodiment, the beacons of the first device is modified to include the attribute associated with the second device. In one embodiment, the first device joins the ad-hoc network previously established by the second device without either of the first and second devices being first powered off.

A device in accordance with one embodiment of the present invention includes a device having disposed therein a processor and a medium for storing codes for execution by the processor, the medium including code for placing the first device in a scanning mode during one of each N beacon transmission periods to scan for beacons transmitted by the second device, and code for prompting a user of the first device to join the ad-hoc network if the first device intercepts a beacon of the second device during the scanning mode. The first and second devices are previously configured as registrars.

The medium further includes, in part, code for modifying beacons of the first device to include an attribute associated with the second device if the user responds affirmatively to the option; and code for attempting to reconfigure the first device as an enrollee if the user responds affirmatively to the option. The medium further includes, in part, code for modifying the beacons if a condition is satisfied.

In some embodiments, the condition is defined by a comparison of time stamps associated with the two devices. In other embodiments, the condition is defined by a comparison of media access controller (MAC) addresses of the two devices. In some embodiments, the option is presented via a text displayed on an LCD panel disposed on the first device. In another embodiment, the option is presented via an audible sound played through a speaker disposed on the first device. In some embodiments, the attribute that is included in the modified beacon is the MAC address of the second device. In one embodiment, the first device joins the ad-hoc network previously established by the second device without either of the first and second devices being first powered off.

A device in accordance with one embodiment of the present invention includes a device having disposed therein a processor and a medium for storing code for execution by the processor, the medium including code for placing the device in a scanning mode during one of each N beacon transmission periods to scan for beacons transmitted by a second device, code for intercepting a beacon of the second device during one of the scan periods of the first device; code for verifying whether the intercepted beacon includes an attribute of the first device; and code for prompting a user with an option to allow the second device to be added to the ad-hoc network of the first device if the intercepted beacon includes the attribute. The first and second devices are previously configured as registrars. The device further includes, in part, code for performing a handshake if the user responds affirmatively to the option.

In one embodiment, the option is presented via a text displayed on an LCD panel disposed on the second device. In another embodiment, the option is presented via an audible sound played on a speaker disposed on the second device. In one embodiment, the attribute is the MAC address of the second device. In one embodiment, the beacons of the first device is modified to include the attribute associated with the second device. In one embodiment, the first device joins the ad-hoc network previously established by the second device without either of the first and second devices being first powered off.

DETAILED DESCRIPTION OF THE INVENTION

A device previously configured as a registrar and that has established an independent ad-hoc network is automatically discovered by another device also previously configured as a registrar. To form an ad-hoc wireless network between these two devices, each device periodically enters a scanning mode to scan for and intercept beacons transmitted by the other device. Upon such interception, one of the devices becomes an enrollee in accordance with a predefined condition and in response to a user selected option. Subsequently, the enrollee modifies its beacons to include an attribute, such as the MAC address, associated with the other device. After intercepting the modified beacon, the remaining registrar prompts its user to decide whether to allow the enrollee to join the registrar's network. If the user responds affirmatively, a handshake is performed between the two devices and a subsequent attempt is made by the enrollee to join the registrar's network. Although the following description is made with reference to an ad-hoc WSC (WPS) network, it is understood that the present invention applies to any other ad-hoc network, WSC or otherwise.

Figure 1A:
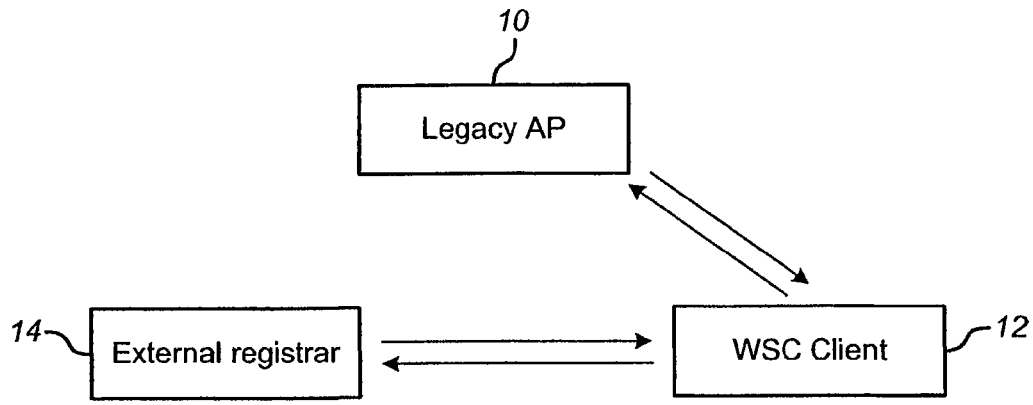
FIGS. 1A-1C show various logical components of a multitude of infrastructure wireless networks.
Figure 1B:
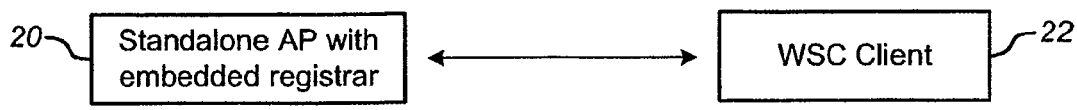
Figure 1C:
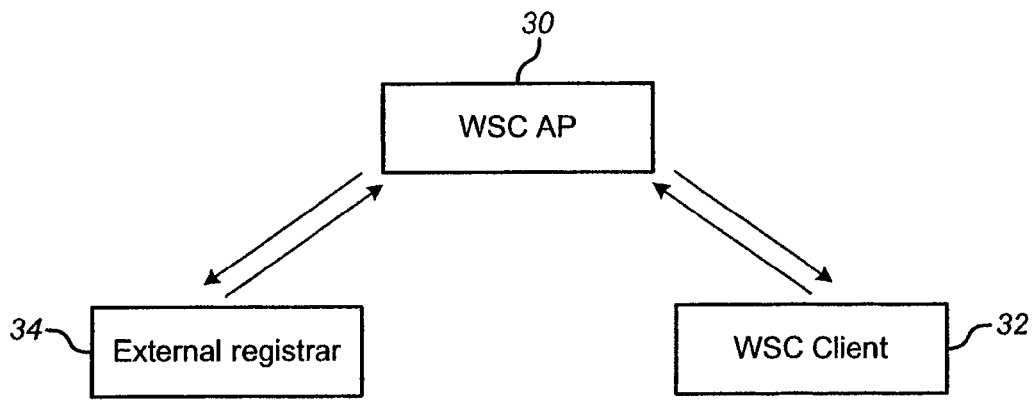
Figure 2:
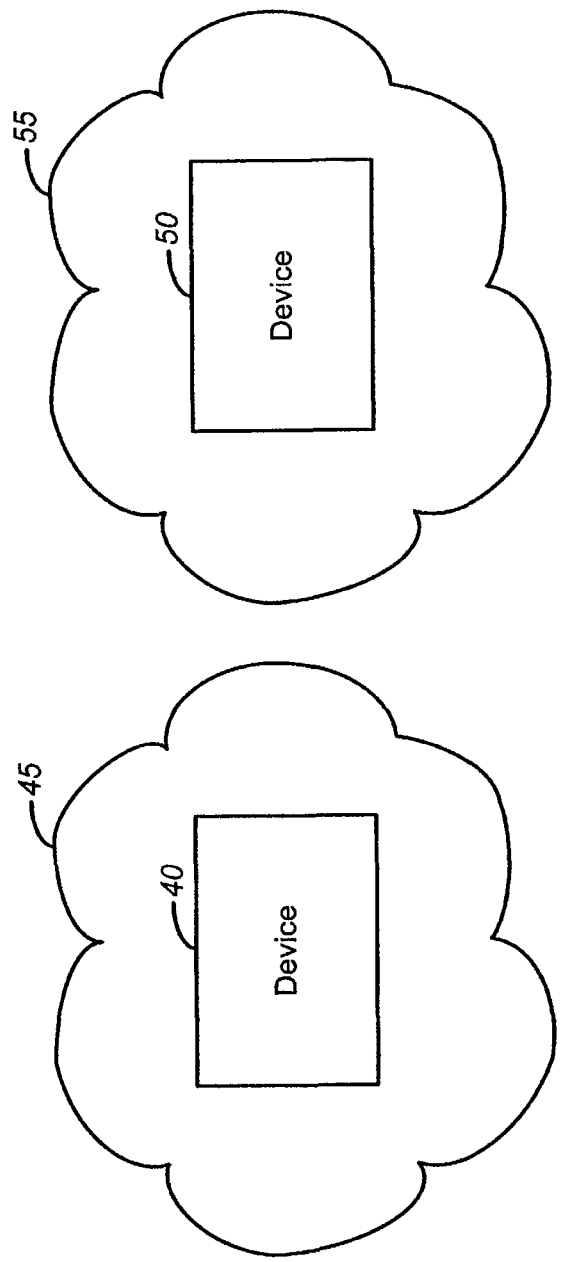
FIG. 2 shows a pair of wireless devices configured to establish a wireless ad-hoc network.

FIG. 2 shows a pair of devices 40 and 50. Each of these device is assumed to have been previously configured as a conventional registrar and to have established an independent network. Device 40 is shown as having formed network 45, and device 50 is shown as having formed network 55. Assume that their respective users are interested in enabling these two devices to exchange data or otherwise interact with one another. For example, devices 40 and 50 may be digital cameras and their users may be interested in exchanging images, or they may be game consoles and their users may be interested in playing an interactive game. Devices 40 and 50 are typically battery-powered, and therefore it is desirable to control and minimize their battery consumption.

Because devices 40 and 50 are assumed to have been previously configured as registrars, they do not perform enrollee scans to join each other's networks. Each of devices 40 and 50 may be caused to become an enrollee if is turned off and turned back on, as described in copending related U.S. application Ser. No. 11/800,166, filed May 4, 2007, entitled "Ad-Hoc Simple Configuration". Alternatively, each such device may be adapted to present its respective user with an option of selecting between adopting an enrollee or a registrar mode of operation when the two users physically acknowledge each other's presence and seek to form a network. This would require the two users to negotiate and agree on selecting one of the devices as an enrollee and the other one as a registrar. However, a typical user is unaware of what a registrar or an enrollee is, and may not appreciate choosing between these two options. In other words, the process of establishing a network between such devices would require burdensome and unfriendly user intervention and which is not automated.

Figure 3:
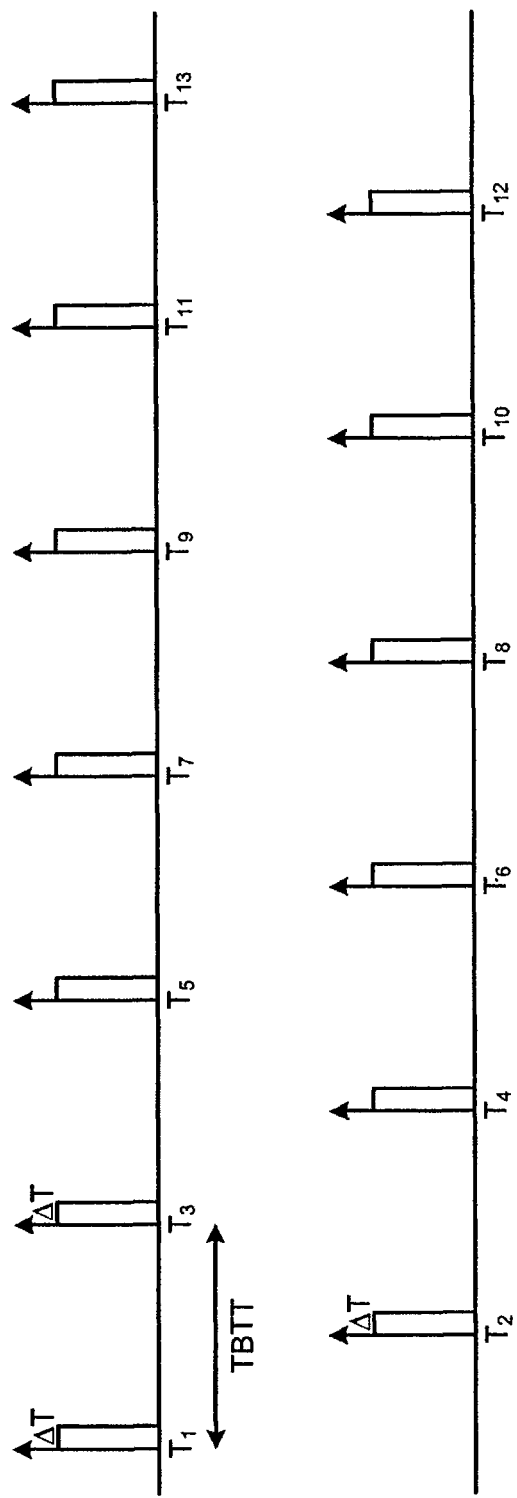
FIG. 3 shows beacon transmission times associated with the devices shown in FIG. 2.

FIG. 3 shows beacon transmission times of devices 40 and 50. Following every beacon transmission, each of devices 40 and 50 remains active for a time period $\Delta T$ to perform a sniff operation, after which the device goes back to a stand-by mode until the next beacon transmission time arrives. As shown in FIG. 3, the beacons transmission times (BTT) for devices 40 and 50 are shifted with respect to one another such that, for example, when device 40 is active, device 50 is in a stand-by mode and vice versa.

Figure 4:
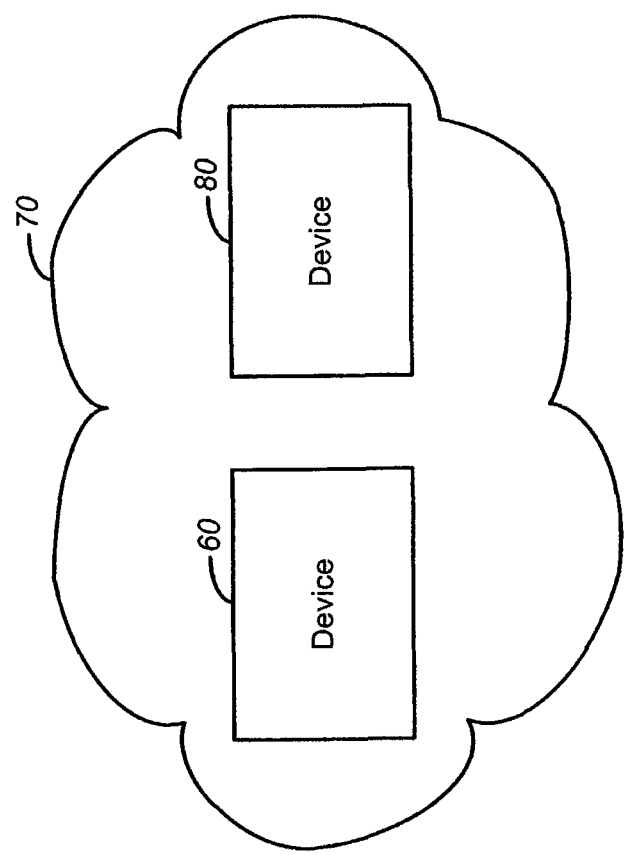
FIG. 4 shows a pair of devices adapted to form a network after they have been configured as registrars, in accordance with one exemplary embodiment of the present invention.

To ensure that devices previously configured as registrars can form a network without burdensome user intervention and without being turned off and on, in accordance with one embodiment of the present invention, each of these devices is modified to periodically wake up from the stand-by mode, also referred to as low-power mode, to enter an enrollee scan mode intercept beacons transmitted by other devices. FIG. 4 shows a pair of devices, 60 and 80 that have been previously configured as registrars, but are adapted, in accordance with one embodiment of the present invention, to form a network 70 to exchange data or interact, as described further below.

Figure 5:
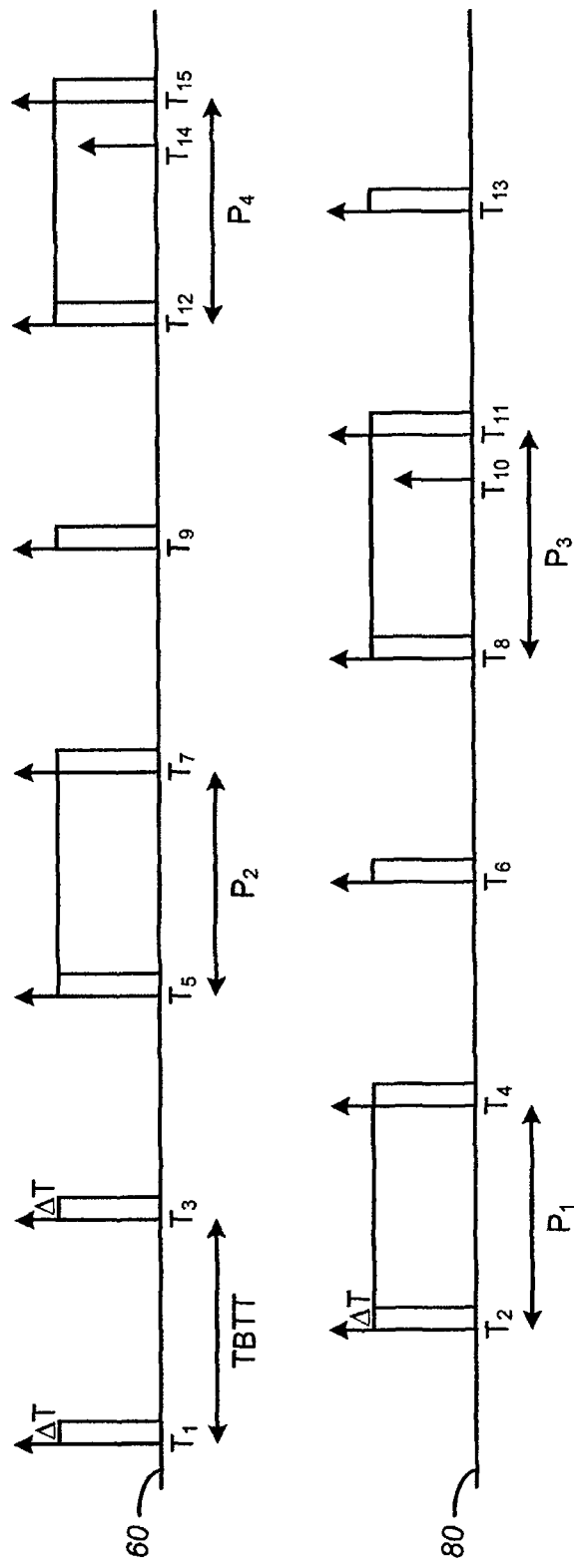
FIG. 5 shows beacon transmission times as well scanning periods of the devices shown in FIG. 4, in accordance with one exemplary embodiment of the present invention.

Referring to FIG. 5, device 60 is shown as transmitting beacons at periodic times $T_1$, $T_3$, $T_5$, $T_7$, $T_9$, $T_{12}$, $T_{15}$, etc, and device 80 is shown as transmitting beacons at periodic times $T_2$, $T_4$, $T_6$, $T_8$, $T_{11}$, $T_{13}$, etc. It is understood that, for example, time $T_2$ occurs between times $T_1$ and $T_3$, and, for example, time $T_{10}$ occurs between times $T_9$ and $T_{11}$.

In accordance with the present invention, every N beacon periods, where N is configurable, one of the devices enters an enrollee scan mode to intercept the beacons transmitted by other devices. Assume in the example shown in FIG. 5 than N is equal to 3. Assume further that device 60 enters an enrollee scan mode between the times $T_5$ and $T_7$, $T_{12}$ and $T_{15}$, etc., and device 80 enters an enrollee scan mode between the times $T_2$ and $T_4$, $T_8$ and $T_{11}$, etc. Accordingly, between the times $T_2$ and $T_4$, for example, device 80 remains active and does not enter the stand-by mode. Similarly, between the times $T_5$ and $T_7$, for example, device 60 remain active and does not enter the stand-by mode. The period covering two successive beacon transmissions is referred to in the following as scanning period.

During the scanning period that starts at time $T_2$, device 80 remains active to intercept beacons transmitted by other devices. Assume during scanning period $P_1$, i.e., between the times $T_2$ and $T_4$, no other Wi-Fi device, such as device 60, is in the vicinity of or can otherwise have its beacons intercepted by device 80. Accordingly, device 80 transmits a beacon at time $T_4$, and shortly thereafter enters the stand-by mode. Similarly, assume during scanning period $P_2$, i.e., between the times $T_5$ and $T_7$, no other Wi-Fi device, such as device 80, is in the vicinity of or can otherwise have its beacons intercepted by device 60. Accordingly, device 60 transmits a beacon at time $T_7$, and shortly thereafter enters the stand-by mode.

Assume between the times $T_7$ and $T_8$, devices 60 and 80 are brought into proximity of one another such that a beacon transmitted by one of these devices can be intercepted by the other device. At time $T_8$, device 80 wakes up, transmits a beacon and enters a scanning mode for the entire duration of period $P_3$. At time $T_{10}$, device 80 intercepts the beacon transmitted by device 60 at time $T_9$ and determines that device 60 is in its vicinity. This leads to the discovery of device 60 by device 80.

Once the discovery is successful, one of the devices is selected to become an enrollee and the other device is selected to remain a registrar. Any arbitrary criteria may be used to make this selection. For example, in one embodiment, the device with the earlier time stamp becomes the registrar, while the device with the later time stamp becomes the enrollee. In another embodiment, the device with the larger Media Access Controller (MAC) address becomes the registrar.

Assume that a predefined condition establishes that the device with the later time stamp is to become an enrollee and the device with the earlier time stamp is to remain a registrar. Assume further that device 60 has an earlier time stamp than device 80. Accordingly, when device 80 intercepts the beacon transmitted by device 60 at time $T_{10}$, the user of device 80 is prompted with an option to decide whether to join device 60's network. This notification may be made via a text displayed on an LCD panel disposed on device 80, or an audible beep played via a speaker disposed on device 80, etc. If the user responds affirmatively to this option, device 80's beacons are modified to include additional information elements. In one embodiment, device 80's beacons are modified to include device 60's MAC address. In other embodiments, device 80's beacons may be modified to include any other attribute associated with device 60. The beacon modification is a way of informing device 60 that device 80 is interested in joining the device 60's network.

At time $T_{11}$ device 80 transmits its modified beacon. However, because between the times $T_9$ and $T_{12}$ device 60 is not in a scanning mode, the beacon transmitted at time $T_{11}$ is not intercepted. Following transmitting its beacon at time $T_{12}$, device 60 enters into a scanning mode during period $P_4$. At time $T_{14}$ device 60 intercepts the beacon transmitted by device 80 at time $T_{13}$. After detecting that the intercepted beacon has device 60's own MAC address, device 60 prompts its user with an option to allow device 80 to joining device 60's network. Such a prompt may be made via a text displayed on an LCD disposed on device 60, or an audible beep played via a speaker disposed on device 80, etc. In other words, a determination by device 60 that the modified beacon transmitted by device 80 includes device 60's MAC address is used, in accordance with one exemplary embodiment, to inform device 60 that device 80 is interested in joining device 60's network.

If the user of device 60 is interested in allowing device 80 to join its network, the user selects one of the options, subsequent to which a handshake is made. After a successful handshake, the independent networks established previously by devices 60 and 80 is coalesced to from network 70 to which both devices 60 and 80 are wirelessly connected.

Figure 6:
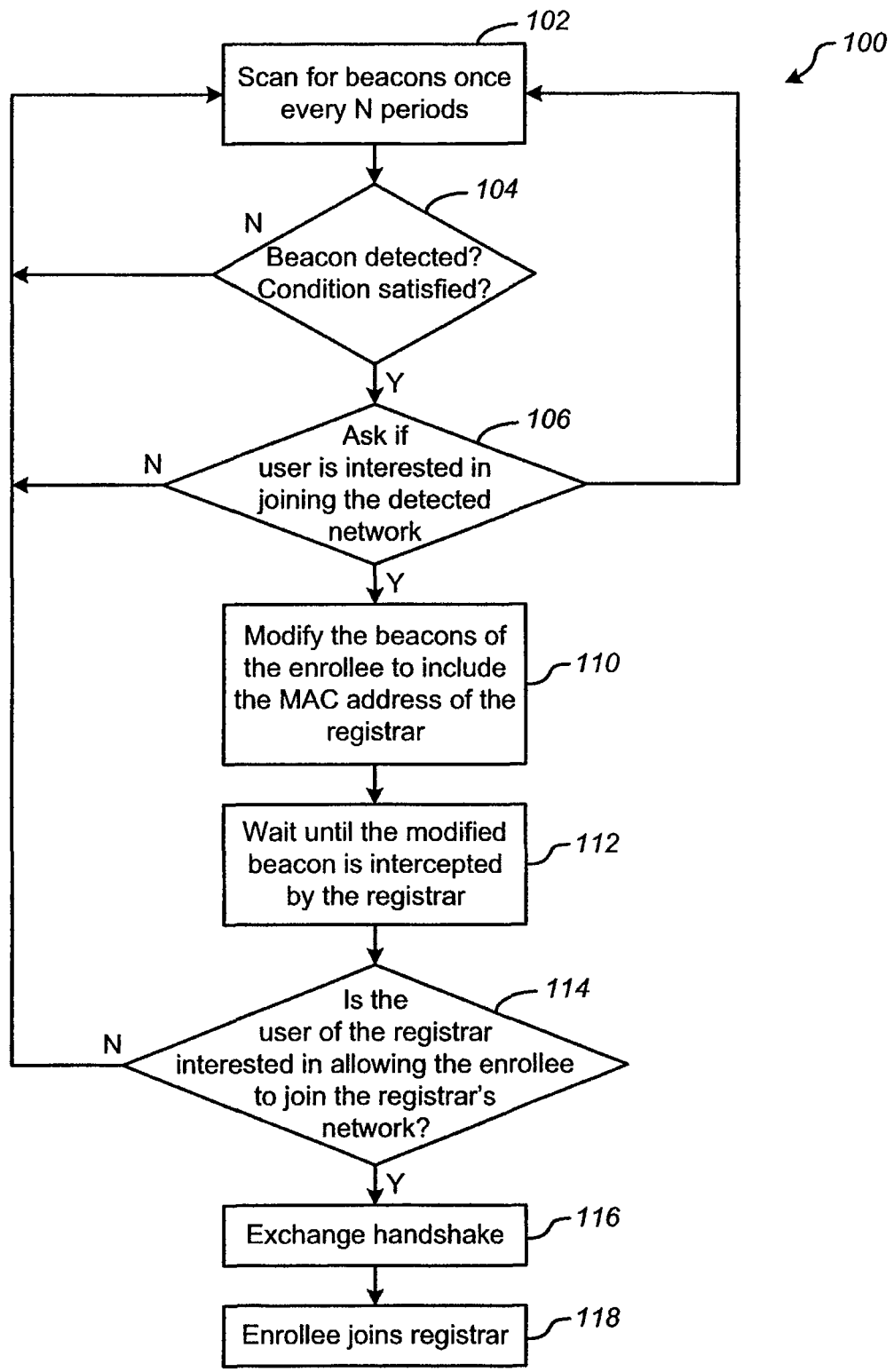
FIG. 6 is a flowchart of step carried out to enable a device configured as a registrar to join an ad-hoc network established by another registrar, in accordance with one exemplary embodiment of the present invention.

FIG. 6 is a flowchart 100 of steps carried out by an enrollee to join a registrar's network. During each of N beacon transmission periods, one of the device enters a scanning mode 102 to intercept beacons transmitted by the other device. If a beacon from the registrar has an earlier timestamp (or higher MAC Address) and a matching criteria is detected 104, the enrollee's user is prompted with an option to decide 106 whether it is interested in joining the registrar's network. If the timestamp or MAC address check fails, the scan results are discarded, in which case, the registrar may attempt to become an enrollee and the enrollee may attempt to become a registrar.

A number of different criterion may be used to perform the match. For example, a match may occur when a camera from a vendor detects a camera from the same vendor, or detects a print service, etc. The additional criterion may be an additional Information Element in the beacon. If such as an additional Information Element is not detected, the scan results are discarded.

If the user responds affirmatively to the option, the enrollee beacons are modified 110. After the modified beacon of the enrollee is intercepted by the registrar 112 while the registrar is in the scanning mode, the registrar's user is presented with an option 114 to decide whether he/she is interested in adding the enrollee to the registrar's network. If the user responds affirmatively to this option, a handshake is performed 116 between the two devices and an attempt is made by the enrollee to join the registrar's network 118.

The above embodiments of the present invention are illustrative and not limiting. Various alternatives and equivalents are possible. Other additions, subtractions or modifications are obvious in view of the present disclosure and are intended to fall within the scope of the appended claims.

What is claimed is:

1. A method of establishing an ad-hoc network connection between a first device and a second device, wherein the first device is operable in a beacon mode to transmit beacons and a scanning mode to receive beacons, the method comprising:

transmitting beacons, with the first device in the beacon mode, wherein beacon periods extend in between each of two consecutive beacon transmissions;

during every Nth beacon period, scanning for beacons with the first device in the scanning mode for a scanning period that covers the beacon period, wherein N is an integer greater than one;

while operating in the scanning mode during one of the Nth beacon periods, receiving, with the first device, a beacon from the second device;

in response to receiving the beacon, determining, with the first device, whether to be configured as an enrollee to join an ad-hoc network established by the second device;

in response to determining to be configured as the enrollee, prompting, with the first device, a user of the first device with an option to join the ad-hoc network established by the second device;

in response to receiving a user response indicating to be configured as the enrollee, sending, with the first device, a second beacon that includes an attribute of the second device; and in response to determining not to be configured as the enrollee, discarding, with the first device, results of receiving the beacon without prompting the user with the option to loin the ad-hoc network established by the second device.

2. The method of claim 1, further comprising: during each of the beacon periods other than the every Nth beacon period, entering a standby mode, with the first device, wherein the first device does not transmit or scan for beacons in the standby mode.

3. The method of claim 1, wherein the ad-hoc network comprises a first ad-hoc network, the enrollee comprises a first enrollee, and the beacon comprises a first beacon, the method further comprising:

after discarding the results of receiving the first beacon, receiving, with the first device in the scanning mode, a third beacon from the second device, wherein the third beacon includes an attribute of the first device that indicates to the first device that the second device wants to join a second ad-hoc network established by the first device.

4. The method of claim 1, further comprising:

after every Nth beacon period, switching, with the first device, from the scanning mode back to the beacon mode.

5. The method of claim 1, wherein determining whether to be configured as the enrollee comprises determining, with the first device, whether to change from being configured as a registrar to the enrollee or to maintain being configured as the registrar.

6. A first device configured to participate in a wireless ad-hoc network session with a second device, the first device comprising:

a user interface; and a controller circuit in communication with the user interface, the controller circuit configured to:

transmit beacons in a beacon mode, wherein beacon periods extend in between each of two consecutive beacon transmissions;

during every Nth beacon period, scan for beacons in a scanning mode for a scanning period that covers the beacon period, wherein N is an integer greater than one;

while in the scanning mode during one of the Nth beacon periods, receive a beacon from a second device;

in response to receipt of the beacon from the second device, determine whether to be configured as an enrollee to join an ad-hoc network established by the second device;

in response to a determination to be configured as the enrollee, prompt, via the user interface, a user of the first device with an option to loin the ad-hoc network established by the second device;

in response to receipt of a user response indicating to be configured as the enrollee, transmit a second beacon that includes an attribute of the second device; and in response to a determination not to be configured as the enrollee, discard results of receipt of the beacon without a prompt to the user with the option to loin the ad-hoc network established by the second device.

7. The first device of claim 6, wherein the controller circuit is further configured to:

during each of the beacon periods other than every Nth beacon period, enter a standby mode, wherein the controller circuit is configured to not transmit or scan for beacons in the standby mode.

8. The first device of claim 6, wherein the ad-hoc network comprises a first ad-hoc network, the enrollee comprises a first enrollee, and the beacon comprises a first beacon, and wherein after the controller circuit discards the results of receipt of the first beacon, the controller circuit is further configured to:

receive a third beacon from the second device when operable in the scanning mode, wherein the third beacon includes an attribute of the first device that indicates to the first device that the second device wants to join a second ad-hoc network established by the first device.

9. The first device of claim 6, wherein the controller circuit is further configured to:

after every Nth beacon period, switch from the scanning mode back to the beacon mode.

10. The first device of claim 6, wherein prior to the determination of whether to be configured as the enrollee, the first device is configured as a registrar, and wherein the controller circuit is further configured to:

change from being configured as the registrar to the enrollee in response a determination to be configured as the enrollee; and maintain configuration as the registrar in response to a determination not to be configured as the enrollee.

11. A method of a first device operating to add a second device to an ad-hoc network established by the first device, the method comprising:

transmitting beacons, with the first device in a beacon mode, wherein beacon periods extend in between each of two consecutive beacon transmissions, wherein a first beacon causes (i) the second device to determine whether to be configured as an enrollee to join the ad-hoc network; (ii) a user of the second device to be prompted with an option to loin the ad-hoc network established by the first device in response to determining to be configured as the enrollee; (iii) the second device to send a second beacon that includes an attribute of the first device in response to the second device receiving a user response indicating to be configured as the enrollee, and (iv) the second device to discard results of receiving the first beacon without prompting the user with the option to loin the ad-hoc network established by the first device in response to determining not to be configured as the enrollee;

during every Nth beacon period, scanning for beacons, with the first device in a scanning mode, for a scanning period that covers the entire beacon period, wherein N is an integer greater than one;

while operating in the scanning mode during one of the Nth beacon periods, receiving, with the first device, the second beacon from the second device; and in response to receiving the second beacon, prompting, with the first device, a user of the first device with an option to decide whether to allow the second device to be added to the ad-hoc network.

12. The method of claim 11, further comprising:

during each of the beacon periods other than the every Nth beacon periods, entering a standby mode with the first device, wherein the first device does not transmit or scan for beacons in the standby mode.

13. The method of claim 11 further comprising:
switching, with the first device, from the beacon mode to the scanning mode after every Nth beacon transmission.

14. The method of claim 11, wherein the attribute indicates to the first device that the second device wants to join the ad-hoc network established by the first device.

15. The method of claim 11, further comprising:
initiating, with the first device, a handshake in response to the user response that indicates that the user wants the second device to be added to the ad-hoc network.

16. A first device adapted to participate in a wireless ad-hoc network session, the first device comprising:
a user interface; and
a controller circuit in communication with the user interface, the controller circuit configured to:
transmit beacons in a beacon mode, wherein beacon periods extend in between each of two consecutive beacon transmissions, wherein a first beacon causes (i) a second device to determine whether to be configured as an enrollee to join the ad-hoc network; (ii) a user of the second device to be prompted with an option to join the ad-hoc network established by the first device in response to determining to be configured as the enrollee; (iii) the second device to send a second beacon that includes an attribute of the first device in response to the second device receiving a user response indicating to be configured as the enrollee, and (iv) the second device to discard results of receiving the first beacon without prompting the user with the option to loin the ad-hoc network established by the first device in response to determining not to be configured as the enrollee;
during every Nth beacon period, scan for beacons in a scanning mode for a scanning period that covers the entire beacon period, wherein N is an integer greater than one;
while in the scanning mode during one of the Nth beacon periods, receive the second beacon from the second device; and
in response to receipt of the beacon, prompt, via the user interface, a user of the first device with an option to allow the second device to be added to an ad-hoc network established by the first device.

17. The first device of claim 16, wherein the controller circuit is further configured to:
during each of the beacon periods other than every Nth beacon period, enter a standby mode, wherein the controller circuit is configured to not transmit or scan for beacons in the standby mode.

18. The first device of claim 16, wherein the controller circuit is further configured to:
switch from the beacon mode to the scanning mode after every Nth beacon transmission.

19. The first device of claim 16, wherein the attribute indicates to the first device that the second device wants to join the ad-hoc network established by the first device.

20. The first device of claim 16, wherein the controller circuit is further configured to initiate a handshake in response to identification of the user that indicates that the user wants the second device to be added to the ad-hoc network.

* * * * *